Feb. 18, 1936.　　　W. J. NEWMAN　　　2,031,279
EXCAVATING MACHINE
Filed April 2, 1934　　2 Sheets-Sheet 1
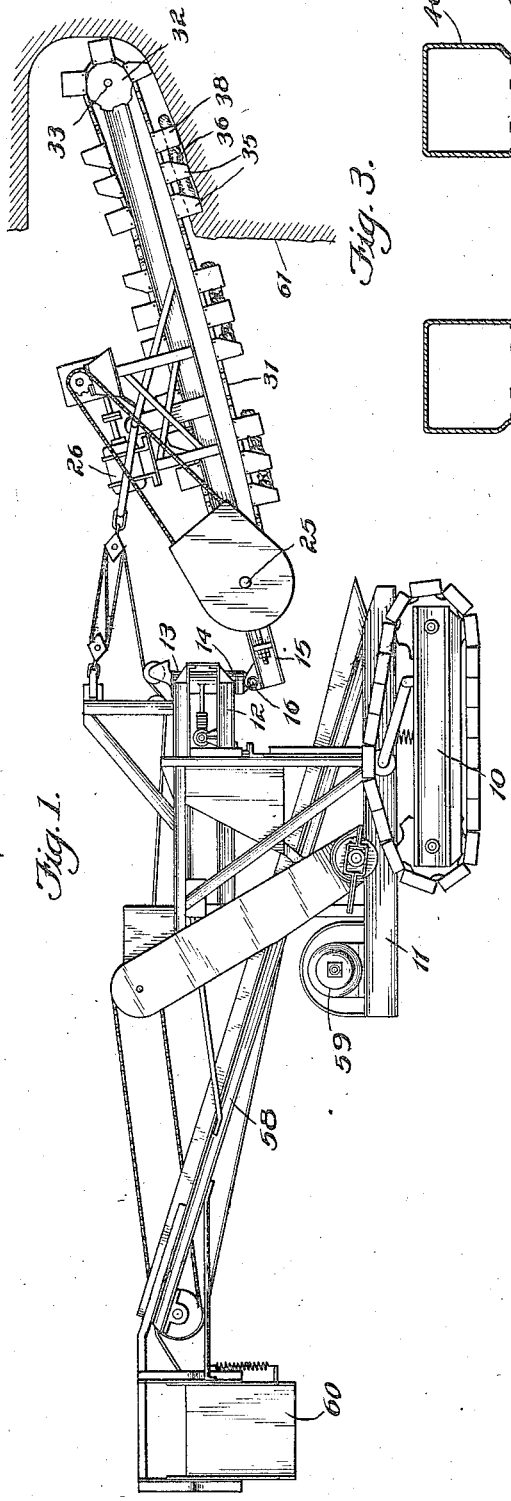
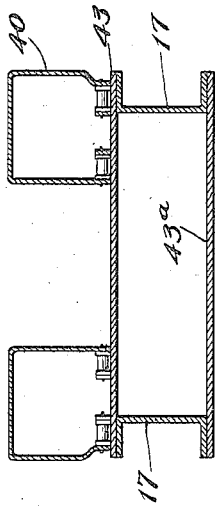
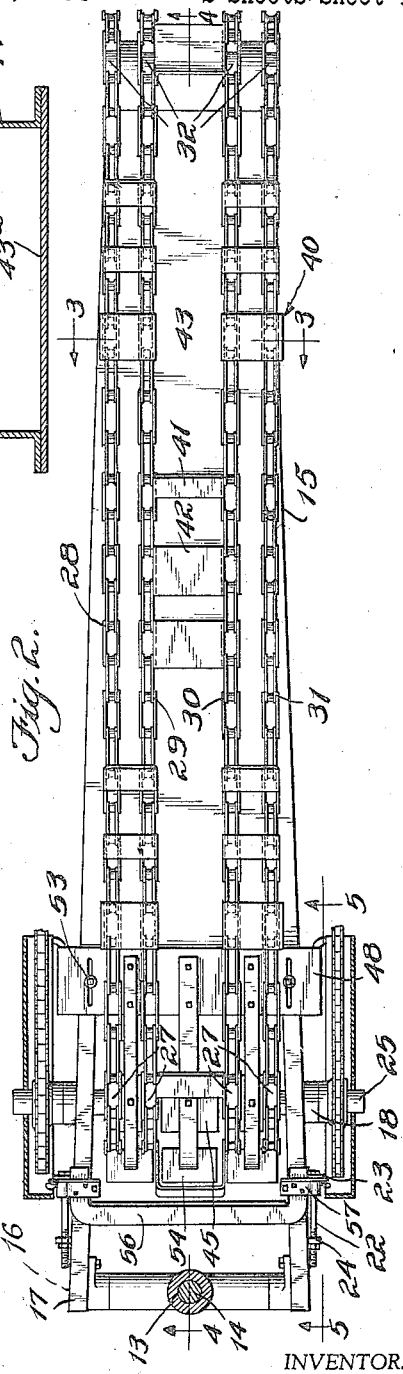
INVENTOR.
William J. Newman.
BY Glenn S. Noble
ATTORNEY.

Feb. 18, 1936.  W. J. NEWMAN  2,031,279
EXCAVATING MACHINE
Filed April 2, 1934  2 Sheets-Sheet 2
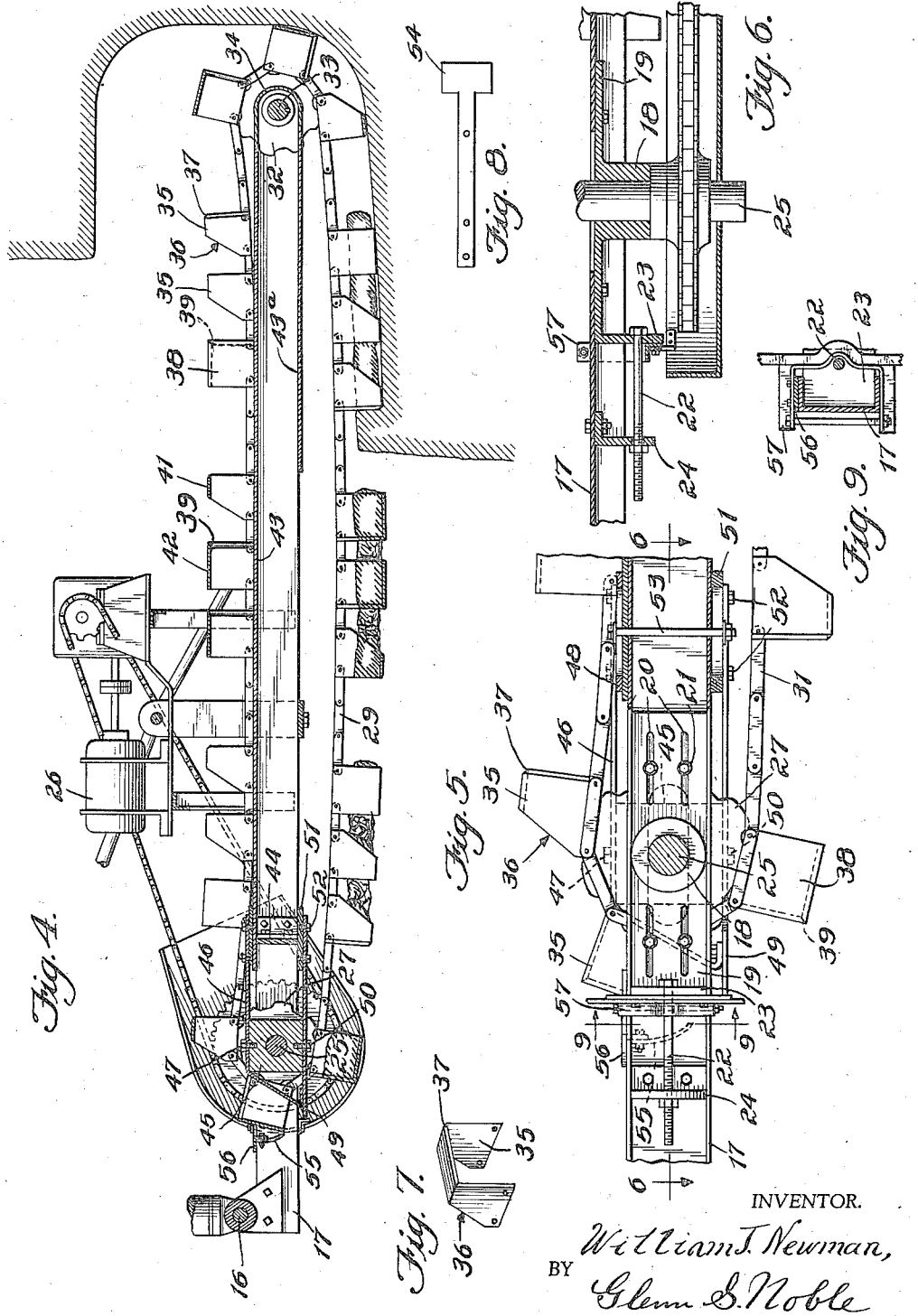

Patented Feb. 18, 1936

2,031,279

UNITED STATES PATENT OFFICE 2,031,279

EXCAVATING MACHINE

William J. Newman, Chicago, Ill.

Application April 2, 1934, Serial No. 718,554

13 Claims. (Cl. 37—191)

This invention relates to a machine or apparatus particularly intended for digging clay or gumbo such as frequently encountered in tunneling work although it is intended for use wherever it may be applicable.

I found that in excavating clay or sticky earth it will adhere to the excavating devices and if buckets are utilized for this purpose it is often difficult or practically impossible to remove the clay from the buckets. In order to overcome these difficulties and such other difficulties as will be readily apparent to those familiar with the art, I have devised a novel cutting and conveying mechanism of the endless belt type in which the cutting elements are in the form of loops and similar to buckets without backs therein. While such improved cutting mechanism may be mounted in various ways for different classes of work, in the present instance I have mounted the same to provide a machine particularly applicable for tunneling purposes.

The objects of this invention are to provide an improved machine of the character indicated which will excavate and convey clay or other sticky material and which may also be used for digging various kinds of earth; to provide an excavating machine having novel cutters and conveyers of an open type; to provide a machine of this character having a plurality of series of cutters arranged in offset or staggered relation whereby relatively small portions of the face which is being acted upon will be cut away at one time; to provide a cutting and conveying apparatus having a plurality of chains arranged adjacent to each other, pairs of said chains carrying cutting and conveying elements and other pairs carrying similar elements arranged in staggered relation with the first named elements; to provide an excavating and conveying apparatus with open cutters or buckets, and means for forcing or scraping the material out of said buckets and off from the same; to provide a tunneling machine having novel means for excavating and conveying or elevating material for loading in cars or the like; and to provide such other novel features and advantages as will appear more fully hereinafter.

In the accompanying drawings illustrating this invention,

Figure 1 is a side view of an excavating or tunneling machine embodying this invention;

Figure 2 is a plan view of the excavating portion of the machine with parts omitted or shown in section;

Figure 3 is a sectional view taken on the line 3—3 of Figure 2;

Figure 4 is a longitudinal sectional view taken on the line 4—4 of Figure 2;

Figure 5 is an enlarged sectional detail taken on the line 5—5 of Figure 2;

Figure 6 is a sectional view taken on the line 6—6 of Figure 5;

Figure 7 is a perspective detail of one of the excavating or cutting elements;

Figure 8 is a detail of one of the scraper paddles; and

Figure 9 is a sectional view taken on the line 9—9 of Figure 5.

In these drawings some of the parts are shown diagrammatically or omitted in places for convenience in illustration. In the apparatus shown the excavating mechanism is mounted on a truck or tractor 10 of any ordinary or preferred form of construction and which is preferably provided with endless belt tracks and suitable means for actuating the same. It is provided with a frame 11 having a forwardly extending bracket 12 with a bearing 13 for a vertical shaft or pivot 14. An elongated frame or boom 15 is pivotally mounted at 16 to the lower end of the shaft 14, thus providing for vertical and horizontal swinging movement of the excavator boom 15. Any suitable means such as indicated may be utilized for raising and lowering the frame or boom 15 and for swinging the same horizontally, the specific means to be used not forming a part of this invention. The frame or boom 15 includes side channels or beams 17 which are connected together by cross bracing. The side channels are provided adjacent to their inner ends with bearings 18 carried on plates 19 which are slidably mounted in the channels. The plates have slots 20 for receiving fastening bolts 21 whereby the plates and bearings may be secured in adjusted position on the channels. The plates and bearings are adjusted in order to regulate the tension on the chains by means of bolts 22 which engage with lugs or flanges 23 on the plates and which extend through brackets 24 on the channels as shown particularly in Figure 6.

A drive shaft 25 is mounted in the bearings 18 and is driven in any suitable manner as by means of a motor 26 mounted on the boom and having suitable driving connections with the shaft.

The shaft 25 carries a plurality of sprockets 27 for the conveyor chains 28, 29, 30, 31. These conveyor chains are supported at the outer end of the boom on sprockets 32 mounted on a shaft 33 which is carried in bearings 34 at the end of the boom.

The outer pairs of chains 28, 29 and 30, 31 are provided with sets of similar cutting and conveying devices which are correspondingly spaced on the different pairs of chains so that the cutting will be equalized. While these sets of cutters may be arranged in different manners I have shown a preferred arrangement for cutting clay. Considering a set of three of these cutting devices, for instance as shown in Figure 4, the first two cutters 35 are substantially U-shape in cross section with the sides riveted or bolted to the chains 28 and 29. The outer rear portion is cut away as indicated at 36 leaving a relatively narrow outer or transverse cutting portion. The outer and side cutting edges of the first cutters are beveled on their outer surfaces as shown at 37 to make a sharp inner cutting edge. The third cutting member 38 in this set is similar to the cutters 35 but is not cut away at the back, thus forming a substantially rectangular box open at its front and back ends. The cutting edges of these members are beveled on the inside as shown at 39 so that material passing from the cutter 35 will slip freely therein. One or more of the cutters of each set, preferably those of the type 38, have their outer sides 40 offset or projecting outwardly from the chain in order to provide for suitable clearance for the chains and the extra material which they cut will tend to wedge the earth in the buckets. The sets and arrangement of the cutters on the respective pairs of outer chains are made uniform so that the cutting on the opposite sides of the boom will be equalized and there will be little tendency toward side strains.

The intermediate chains 29 and 30 are provided with cutting and conveying members 41 and 42 which are similar to the respective cutters 35 and 38 although in the particular arrangement shown these chains are spaced farther apart so that these center cutters are wider than the side cutters. They are preferably arranged in sets as shown, the sets of cutters of the center chains being in offset or staggered relation with the sets of cutters of the side chains as will be readily seen from Figure 2.

The boom 15 has a longitudinal guide plate 43 over which the excavating chains may slide in their outer movement, it being understood that the top flights move outwardly so that the cutters cut with a downward and rearward movement. The inner end of the plate 43 terminates a short distance from the shaft 25 and is supported on a cross brace 44. The boom is also provided on its lower side with another plate 43a which may serve as a guide for the cutter chains during the cutting action, the arrangement being such that this plate may at times press downwardly on the cutter chains during their return movement, particularly if the cutting is heavy or difficult. These chains are preferably of the roller type so that they will move freely along such guide plates.

The shaft 25 carries blocks or bearings 45 which are rectangular in cross section as shown in Figure 4. Strips or bars 46 are secured to the blocks 45 by means of screws 47 and extend forwardly over the plate 43 where they are attached to a cross plate 48. The rear ends of these bars are bent downwardly and are secured to the rear ends of the longitudinally arranged scrapers or paddles 49 which are attached to the blocks 45 by screws 50. The front ends of the scrapers are secured to a cross plate 51, by means of screws 52. The plates 48 and 51 are fastened together by bolts 53 which extend through slots in these plates and engage with the upper and lower parts of the boom as shown in Figures 2 and 5. The rear ends of these scrapers or cleaning devices project through the spaces between the respective pairs of chains and are enlarged or provided with substantially rectangular cleaning portions 54 which fit rather closely within the cutting or excavating members so that any material therein will be forced out by such paddles.

In order to scrape or clean off the outer surfaces of the excavating devices I provide a transverse scraper 55 which is secured to an angle bar 56. The ends of this bar are bent at substantially right angles to the main portion and are secured to clips or clevises 57 which in turn are secured to the flanges 23 of the plates 18 so that the scraper and parts connected therewith may be adjusted longitudinally of the boom with the other parts when the chains are tightened or adjusted.

The material which is excavated by the excavating apparatus may be disposed of in any convenient manner as by means of a conveyor 58 which is driven in any suitable manner as by means of a motor 59 mounted on the main frame and provided with suitable driving connections. This conveyor is provided with a discharge chute 60 for discharging the material into cars or trucks. It will be noted that the boom and conveyor as well as the tractor mechanism are all provided with controlling and adjusting devices for operating and adjusting or swinging the same such as usually provided in machines of this character.

In the operation of the device, the forward end of the boom is brought in position with respect to the wall 61 which is to be excavated, so that the respective excavating devices will be brought to act upon the same. Usually an initial cut is made at the top of the tunnel of several feet in depth and then the boom swung downwardly to cut out an arcuate section. When the cutters 35 for instance engage with the material to be excavated they will shave or cut out a section or chunk of varying length which will ordinarily pass therethrough into the next succeeding buckets or cutters such as 38. These succeeding cutters of a series may also cut or shave off more of the material so that it will be collected and carried along in the three buckets of the series back to the rear end of the boom where it will drop out or be forced out by the paddles or scrapers 54 and 55, thus entirely cleaning the cutters ready for the next cutting operation. The length of these cutter blades may be varied and the spacing between the blades of a set may also be varied in accordance with the material to be excavated, the purpose being that the excavated material will be caught and carried in these combined cutting and carrying members, and instead of having portions merely carried in each bucket or cutter as in the ordinary bucket excavators, the material may be distributed through several sections. After the side cutters 35 and their coacting members engage with the face of the material they will cut or form grooves or kerfs with unexcavated material between the same, which unexcavated material will then be attacked by the center or intermediate cutters 41, 42. The arrangement and operation of these intermediate cutters is similar to the side cutters and they may also be varied in length and in positioning in accordance with the material to be acted upon, it being the purpose that these members will carry back such material as they cut from the face. It will thus be seen that by means of these open back buckets or U-shaped cutters, the material may be easily excavated and, what is of greatest importance, particularly in connection with clay, may be readily discharged or scraped out of the buckets onto the elevating conveyor.

When the chains for the excavators are to be tightened or adjusted the holding bolts such as the bolts 21 and 53 are loosened and by adjusting the tightening bolts 22 the bearings 18, drive shaft 25 and scrapers 54, 55, etc. are all moved simultaneously so that the scrapers are kept in proper relation with the excavators. When the chains have been suitably adjusted the holding bolts are again tightened and the parts are held in position for operation.

The machine is illustrated with four chains as above described but it is contemplated that any desired number of such chains may be used with buckets arranged in suitable positions thereon to accomplish the desired purposes.

While I have shown a preferred form of my invention it will be noted that various changes may be made in the arrangement of the parts or in the general construction thereof in order to adapt the same for different conditions and therefore I do not wish to be limited to the particular structure herein shown and described except as specified in the following claims, in which I claim:

1. The combination with a pair of chains, of a set of excavating elements comprising leading cutting members and trailing conveying members, each of said members having parallel sides secured to the respective chains, transverse outer portions and open at both ends, said conveying members being arranged sufficiently close to the cutting member and to each other to receive and convey the material excavated by the cutting member.

2. The combination with a pair of endless chains, of a plurality of substantially U-shaped cutting and conveying elements, open at both ends, said elements being arranged in sets longitudinally of the chains and the sets spaced apart for the purposes described, each of said sets consisting of a leading cutting member and a plurality of following conveying members adapted to receive the material excavated by the cutting member and to coact with the cutting member to convey such material.

3. The combination with a pair of chains, of a plurality of substantially U-shaped cutting and conveying members having no bottoms, the leading member being sharpened to excavate the material and the succeeding members being spaced from the leading member and from each other suitable distances to receive and hold material excavated by the leading member.

4. In a tunneling machine, the combination of a boom, a plurality of chains mounted on said boom, means for driving said chains and sets of bottomless cutting and conveying buckets secured to pairs of said chains, each set comprising a forward cutting member and one or more following conveyor members spaced to coact with the cutting member to carry the excavated material, the sets on one pair of chains being in staggered relation to the sets on the other pairs of chains.

5. In an excavating machine, the combination of a boom, means for supporting said boom, four parallel chains carried by said boom, means for driving said chains, sets of cutting and conveying buckets carried by each of the outer pairs of chains open at both ends thereon and arranged in corresponding positions thereon and sets of similar cutting and conveying buckets carried by the intermediate chains and arranged in staggered relation with the sets of buckets on the outer chains.

6. In an excavating machine, the combination of a boom, a pair of chains carried by said boom, U-shaped cutting and conveying members secured to said chains, a paddle mounted on the boom and adapted to coact with the cutters for scraping the material out of the cutters, and a scraper carried by the boom and adapted to coact with the outer surfaces of the cutters for scraping the material therefrom.

7. In an excavating apparatus, the combination of a boom, a plurality of chains carried by said boom, cutting and conveying members of substantially U-shape cross section carried by pairs of chains, a plurality of paddles mounted to project within the paths of said members to scrape the material therefrom, and a scraper common to the members on all of said chains for scraping the material from the outer surfaces of said members.

8. A tunneling machine including a boom, a shaft mounted at the outer end of the boom, a plurality of sprockets on said shaft, a driving shaft mounted at the inner end of the boom, a plurality of sprockets mounted on the driving shaft, endless chains coacting with the sprockets on said shafts, U-shaped cutting and conveying members carried by said chains, each member being attached to two of said chains, bearings for the driving shaft, means for adjusting said bearings to adjust the chains, and scrapers adapted to coact with said cutting members, said scrapers being connected with bearings on said shaft whereby the scrapers will remain in fixed position relative to the shaft and will be adjusted longitudinally of the boom when the shaft is adjusted.

9. In an excavating apparatus, the combination of a boom having side channels, bearings adjustably mounted on said channels, a drive shaft engaging with said bearings, bolts for adjusting the bearings longitudinally of the channels, blocks mounted on said shaft, cross plates above and below the channels, bars secured to the upper cross plates and to said blocks and projecting downwardly adjacent to the shaft, scraper paddles secured to the lower plate and to said blocks and connected with the first named bars, and bolts for holding said upper and lower plates in adjusted position on the channels.

10. In a machine of the character set forth, the combination of conveyor supporting channels, plates adjustably mounted on said channels, brackets on said channels, bolts engaging with said plates and said brackets for moving the plates longitudinally of the channels, bearings on said plates, a drive shaft engaging with said bearings, sprockets on said shaft, blocks arranged on the shaft between the sprockets, cross plates slidably mounted on the channels, bars engaging with the cross plates and the blocks and extending beyond the blocks, scraper paddles having their shanks secured to the other cross plate and to said blocks and projecting beyond the blocks, means for securing the ends of the bars to the respective paddles, a scraper arranged transversely of the channels and connected with said plates whereby the scraper and paddles will be moved longitudinally when the shaft is adjusted.

11. In an excavating machine, the combination with an adjustable driving shaft, of means for adjusting said shaft, and scrapers connected with the shaft so that they will be moved when the shaft is adjusted.

12. An excavating machine comprising a movable support, a boom pivotally mounted on said support, means for swinging the boom, a drive shaft mounted at the inner end of the boom, means for driving said shaft, a plurality of sprocket wheels secured to said shaft, a guide shaft at the outer end of the boom, sprocket wheels mounted on said guide shaft, chains carried by said sprocket wheels, digging and conveying buckets having no backs therein carried by pairs of said chains, said buckets being arranged so that a trailing bucket will coact with a leading bucket for conveying material, stationary means adjacent to the driving shaft for cleaning the material from said buckets, and a conveyor mounted on the frame and adapted to receive material from the buckets.

13. In an apparatus of the character set forth, the combination of a pair of chains, means for supporting said chains, an excavating and cutting member of substantially rectangular cross section having the sides secured to the respective chains and having no back therein, and a second similar member of substantially rectangular cross section arranged adjacent to the first named member, said second named member having one side projecting beyond the side of the first named member whereby the second named member will increase the width of the cut to provide clearance for the adjacent chain, said second member being arranged sufficiently close to the first named member to coact therewith to hold and convey the material excavated by said members.

WILLIAM J. NEWMAN.